United States Patent [19]

Hill

[11] Patent Number: 4,779,354
[45] Date of Patent: Oct. 25, 1988

[54] VARIABLE ANGLE PROTRACTOR

[76] Inventor: Michael J. Hill, 3305 Daisy, Pasadena, Tex. 77505

[21] Appl. No.: 90,206

[22] Filed: Aug. 27, 1987

[51] Int. Cl.⁴ ............................................. B27G 23/00
[52] U.S. Cl. ........................................ 33/640; 33/465; 33/403
[58] Field of Search ................. 33/403, 471, 626, 630, 33/633, 634, 640, 424, 495–500, 465, 538, 534, 418, 481, 452, 469

[56] References Cited

U.S. PATENT DOCUMENTS

| | | | |
|---|---|---|---|
| 2,011,945 | 8/1935 | Mathi | 33/488 |
| 2,631,376 | 3/1953 | Callahan | 33/424 |
| 2,770,042 | 11/1956 | Hone | 33/403 |
| 3,070,887 | 1/1963 | Olsen | 33/471 X |
| 4,443,950 | 4/1984 | Cockeram | 33/465 X |

FOREIGN PATENT DOCUMENTS 7310 of 1906 United Kingdom ................. 33/424

*Primary Examiner*—Harry N. Haroian
*Attorney, Agent, or Firm*—J. Peppers

[57] ABSTRACT

An improved adjustable protractor including a flat base member in pivoted connection with a pivoting member. The base member is calibrated with degrees indicia. The pivoting member includes an indicia indicator to detect designated degree indicia. Clamp is provided to clamp members together at a selected position.

6 Claims, 1 Drawing Sheet

VARIABLE ANGLE PROTRACTOR

FIELD OF THE INVENTION

This invention generally relates to protractor apparatus and more particularly relates to precision protractor apparatus for measuring the angle at which a cutting tool such as a saw blade is positioned with respect to a reference plane such as the working surface of a table saw.

BACKGROUND OF THE INVENTION

Wood working power tools have cutting elements fixed at a selected angle with respect to a respective reference plane. Accurate adjustment of a cutting element to the selected angle is important in order for the apparatus to cut a particular piece acceptable for use.

Many machines are not equipped to find the selected angle needed. Other machines have angle finding accessories which are not accurate enough to position the cutting element sufficiently close to the selected angle.

For example, the saw blade angle and height adjustment mechanism incorporated in a typical table saw includes an angle and height indicator for the saw blade, but the actual angle and height have to be separately an manually measured in order to position the saw blade with sufficient precision.

The cutting element of other tools also need to be manually measured in order to function as desired. Such tools are radial arm saws, miter saws, band saws, scroll saws, circle saws, drill presses, taper jigs and similar tools as used in the wood working and metal working arts. There is a definite need for the present invention.

Presently known prior art measuring apparatus is disclosed in U.S. Pat. No. 1,594,097, U.S. Pat. No. 1,839,014, U.S. Pat. No. 2,587,077, U.S. Pat. No. 2,632,483, U.S. Pat. No. 2,735,182, U.S. Pat. No. 2,899,750, U.S. Pat. No. 2,959,861, U.S. Pat. No. 4,443,950 and British Pat. No. 218,135 (1924) for example:

OBJECTS OF THE INVENTION

An object of the present invention is to provide a precision protractor to adjust the angle of a cutting tool with reference to a reference plane.

Another object of the present invention is to provide a precision protractor which will readily measure the height of the cutting tool as extending from the reference plane.

It is a further object of the present invention to provide a precision protractor that can be used in the shop and also used equally well by a draftsman on a drafting table.

SUMMARY OF THE INVENTION

The foregoing and other objects and advantages of the present invention are attained by an improved adjustable protractor which includes a reference base base member having three sides including a horizontal bar formed with an arcuate bar. A flat pivoting member is formed with three sides including a bottom side disposed at right angles to a vertical side with a top side extending from the bottom side to the vertical side. A pivot member connects the base member to the pivoting member with the pivot being the effective apex of the arcuate bar. The edge of the arcuate bar is calibrated along a radius from the apex with degrees of angle indicia. An angle indicator is mounted on the pivoting member on a radius with the apex to indicate the rotational position of the pivoting member with respect to the angle indicia as marked on the arcuate bar. Such angle indicator thereby indicates the position of the vertical side of the pivoting member with respect to the edge of the horizontal bar of the base member. The vertical side of the pivoting member forms front and rear grooves adjacent to he edge of the vertical side. A rear bar has a tongue slideably mounted within the rear groove, permitting the rear bar to be positioned at the same reference plane as the base member. The edge of the vertical side is calibrated along its length with inches indicia. A front bar has a tongue mounted in the front groove an an indicator bar extending at right angles to the indicia on the vertical edge so that the indicator bar may be positioned at the distance that a cutting tool extends away from the reference plane. The indicator bar is visually compared with the inches indicia on the vertical edge to produce this indication. The front bar and the rear bar may be appropriatly clamped together to vertical postions along the vertical edge by a first clamp which may be a thumb screw arrangement. The base member and pivoting member are appropriately clamped together against a relative pivoting movement at any angular position of the pivoting member with respect to the base member by a second adjustable clamp which also may be a thumb screw arrangement. The first clamp and the second clamp are located with the finger nuts located on the front of the protractor such that both clamps may be adjusted from the front.

DETAILED DESCRIPTION OF A PREFERRED EMBODIMENT

Figure 1:
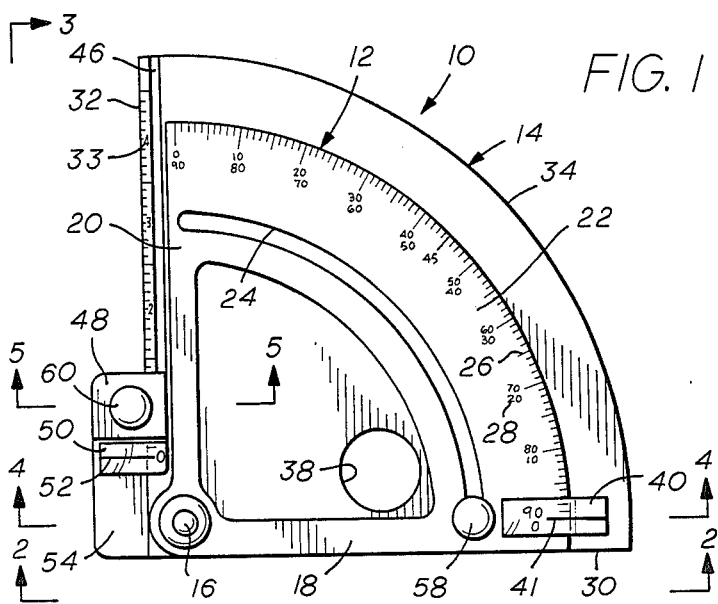
FIG. 1 is a front elevational view of the protractor.
Figure 3:
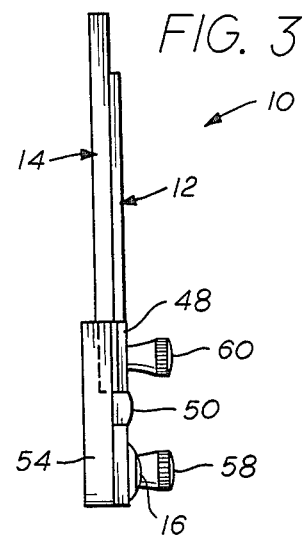
FIG. 3 is a view taken along the line 3—3 of FIG. 1 and looking at the vertical side of the protractor and the vertical edge of the pivoting member.
Figure 2:
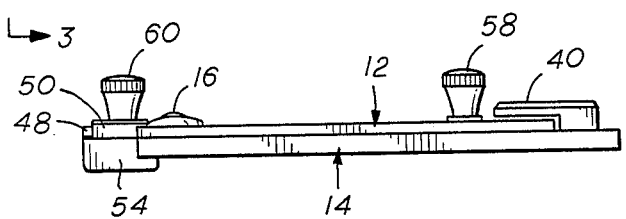
FIG. 2 is a view taken along the line 2—2 of FIG. 1 and looking up at the bottom of the protractor.
Figure 4:
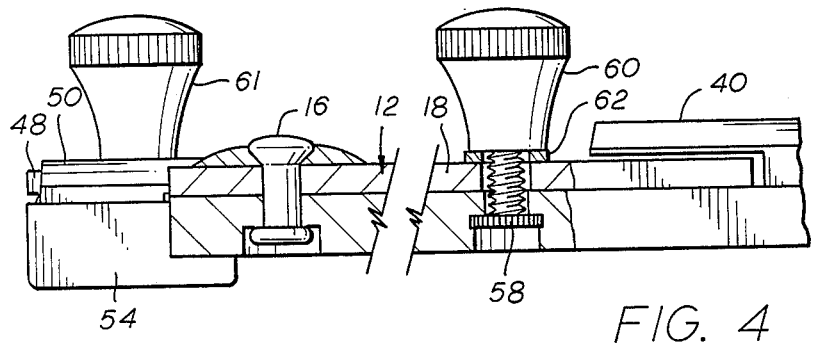
FIG. 4 is a view taken along the line 4—4 of FIG. 1 and showing the adjustable clamp and the magnifying indicator bar of the protractor along with the detail of the pivot hinge.
Figure 6:
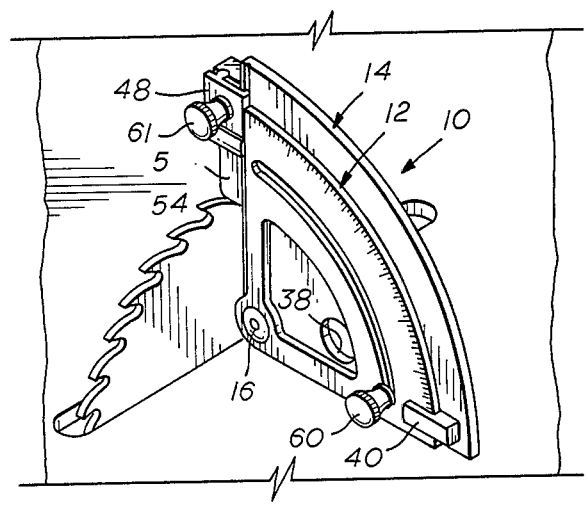
FIG. 6 is a front elevational view of the protractor as placed in measuring position against a table saw blade with the front bar slid down to the plane of the table saw table and the indicator bar slid down to the cutting edge of the saw blade.

Referring first to FIGS. 1 and 6, the adjustable protractor 10 is illustrated as having a base member 12, a pivoting member 14, and a hinge pivot 16. The base member 12 includes a horizontal bar 18, a vertical bar 20, and an arcuate bar 22. As shown, the arcuate bar 22 forms an arcuate slot 24 extending on a radial arc about the pivot 16. The base member 12 is clamped to the pivoting member 14 by a pivoting member threaded lug 58 extending through the pivoting member 14 and slot 24 and threaded into a thumb nut 60 through a retainer washer 62.

The arcuate bar 22 is marked with calibrations 26 and with indicia in degrees as indicated at 28.

The pivoting member 14 is formed with a bottom side 30, a vertical side 32 and an upper side 34 extending between the sides 30 and 32. The upper side 34 is shown as being arcuate in shape, though the arcuate shape is for appearance more than function. A finger hole 38 is formed in the pivoting member 14 as shown, such that a human finger may assist in adjustment of the pivoting member 14 with respect to he base member 12.

A semicylindrical magnifying position indicator 40 having a hairline 41 is mounted as shown on pivoting member 14 where it overhangs the calibrated part of the arcuate bar 22. As shown, the hairline 41 may be compared with the calibrations 26 and degree indicia 28 on the bar 22.

Figure 5:
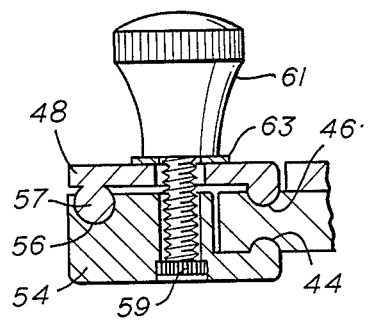
FIG. 5 is a view taken along the line 5—5 of FIG. 1 and showing the first adjustable clamp as fixing the front measuring bar and the rear measuring bar of the instrument.

As best seen in FIG. 5, a rear retainer groove 44 is formed in the pivoting member 14 near the vertical side 32 and parallel thereto. A front retainer groove 46 is formed near and parallel to the vertical side 32. As shown, a front measuring bar 48 has a tongue portion slidingly fitted into the front groove 46 where it may slide up and down along the vertical side 32. As shown in FIG. 1, the front measuring bar carries a magnifying indicator 50 having a hairline 51. Ther vertical side 32 is calibrated with inches indicia 33.

A rear measuring bar 54 is formed with a tongue slidingly fitted into the rear groove 44 where it may slide up and down. As shown, the rear measuring bar is formed with a groove 56 which receives a tongue 57 formed on measuring bar 54. Here it is to be noticed that both the front bar 48 and the rear bar 54 are formed to accommodate a threaded clamp lug 59 which extends adjacent to the front bar 48, the pivoting member 14 and a hole in the rear bar 54 to be threadedly secured by means of a thumb nut 61 and a washer 63.

OPERATION OF THE PREFERRED EMBODIMENT

In operation, and as shown in FIG. 6, a cutting tool, for example the saw blade in a table saw, is approximately adjusted to a desired angle and height. The protractor 10 is then angularly adjusted to the angle of the saw blade with the hairline 41 then indicating the angle of the saw blade.

As a separate measurement, the measuring bar 54 is brought down to the saw blade with the hairline 51 indicating the height of the saw blade.

The thumb nuts 60 and 61 thereon may be clamped.

Alternately, the protractor 10 may be set as shown in FIG. 6 with a desired height of the measuring bar 48 as viewed through position indicator 50 and a desired angle as viewed through the position indicator 40 whereupon the thumb nut 60 and nut 61 are screwed down to clamp the members at the prescribed settings. The saw blade is then adjusted to reach the desired cutting angle. Separately, and usually at 90 degrees, the saw blade may be raised or lowered to reach the desired extension of the saw blade out from the reference plane of the saw table. FIG. 6 illustrates such a saw blade at a prescribed height.

As desired, the assembly including the measuring bar 48 and the retainer bar 54 may be slipped out of the grooves 44 and 46, and set aside. The protractor 10 may then be used as previously described.

It is to be noted that the preferred embodiment may be modified considerably from the specific embodiment herein disclosed, all without departing from the spirit of the invention and the purview and scope thereof as defined in the appended claims.

What is claimed is:

1. An improved adjustable protractor, comprising:
  (a) a horizontal bar having an arcuate bar to form a flat reference base member;
  (b) a flat pivoting member formed with three sides including a bottom side disposed at a right angle to a vertical side and with a top side extending across from the bottom side of the vertical side;
  (c) a pivot member connecting said base member to said pivoting member with said pivot member being the effective apex of said right angle and said arcuate bar;
  (d) said arcuate bar being calibrated on an arc from said apex with angular degree indicia;
  (e) a semi-cylindrical magnifying indicia indicator having including a hairline mounted on said pivoting member in and radial alignment with said apex to indicate the rotational position of the pivoting member with respect to the degrees indicia calibrated on said arcuate bar thereby to indicate the position of said vertical side of said pivoting member with respect to the horizontal bar of said base member;
  (f) a first adjustable clamping means for clamping said base member and said pivoting member together against relative movement at any angular position of said pivoting member with respect to said base member;
  (g) said pivoting member has a front groove adjacent and parallel to the length of said vertical side and a rear groove also adjacent and parallel to said vertical side;
  (h) a front bar having a tongue mounted in adjustably slidable relation within said front groove to be positioned along side said vertical side and a magnifying indicia indicator having a hairline;
  (i) said vertical edge being calibrated along its length with inches indicia;
  (j) a rear bar having a tongue mounted in adjustably slidable relation within said rear groove;
  (k) said front bar indicia indicator being visually comparable with said inches indicia marked on said vertical edge; and
  (l) a second adjustable clamping means for clamping said front bar and said rear bar with said pivoting member in respective positions assumed along said vertical edge.

2. The protractor of claim 1 wherein said vertical edge indicia indicator includes a hairline seen through a magnifying glass.

3. The protractor of claim 1 wherein said front bar and said rear bar is detachable from said pivoting member.

4. The protractor of claim 1 wherein said second clamping means comprises a second threaded lug extending through said back bar and said front bar to be secured by a second threaded thumb screw.

5. An improved adjustable protractor comprising in combination:
  (a) a horizontal bar having an arcuate bar to form a flat reference base member;
  (b) a flat pivoting member formed with three sides including a bottom side disposed at a right angle to a vertical side and with a top side extending across from the bottom side to the vertical side;

(c) a pivot member connecting said base member to said pivoting member with said pivot member being the effective apex of said right angle and said arcuate bar;

(d) said arcuate bar being calibrated on an arc from said apex with angular degree indicia; and (e) a magnifying indicia indicator having a hairline mounted on said pivoting member in radial alignment with said apex to indicate the rotational position of the pivoting member with respect to the degrees indicia calibrated on said arcuate bar thereby to indicate the position of said vertical side of said pivoting member with respect to the horizontal bar of said base member, and (f) a first adjustable clamping means for clamping said base member and said pivoting member together against relative movement at any angular position of sad pivoting member with respect to said base member;

(g) said pivoting member has a front groove adjacent and parallel to the length of said vertical side and a rear groove also adjacent and parallel to the said vertical side;

(h) a front bar having a tongue is mounted in adjustably slideable relation within said front groove to be positioned along side vertical side and a magnifying indicia indicator having a hairline;

(i) said vertical edge being calibrated along its length with inches indicia;

(j) a rear bar having a tongue mounted in adjustably slideable relation within said rear groove;

(k) said front bar indicia indicator being visually comparable with said inches indicia marked on vertical edge; and (l) a second adjustable clamping means for clamping said front bar and said rear bar with said pivoting member in respective positions assumed along said vertical edge.

6. The protractor of claim 5 wherein said front bar and said rear bar is detachable from said pivoting member.